No. 878,816. PATENTED FEB. 11, 1908.
F. W. MAXSTADT.
SLEEVE FOR JOINING WIRE ENDS.
APPLICATION FILED NOV. 7, 1904.
2 SHEETS—SHEET 1.
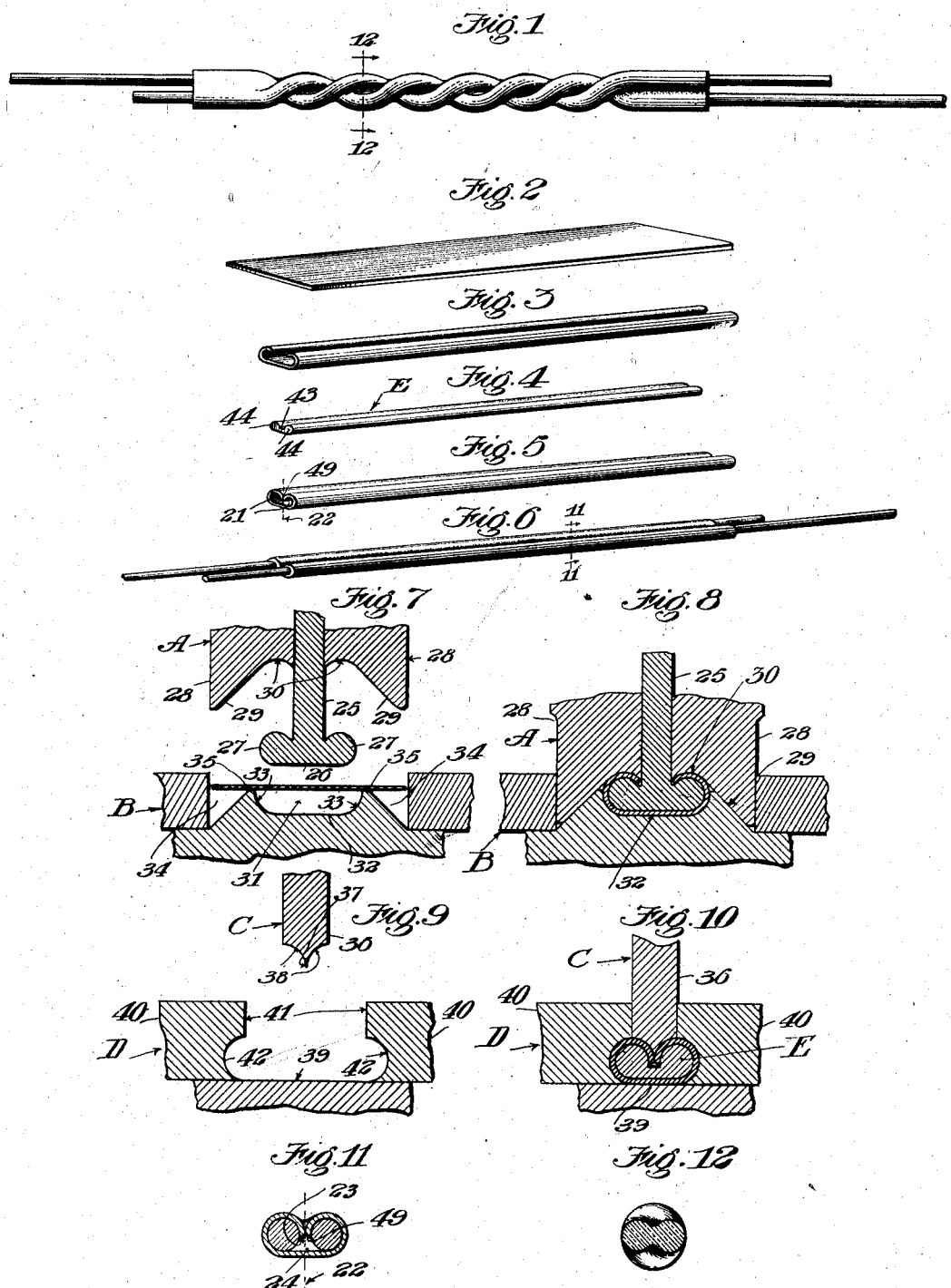

No. 878,816. PATENTED FEB. 11, 1908.
F. W. MAXSTADT.
SLEEVE FOR JOINING WIRE ENDS.
APPLICATION FILED NOV. 7, 1904.
2 SHEETS—SHEET 2.
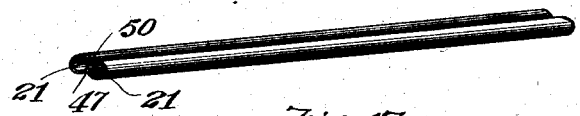
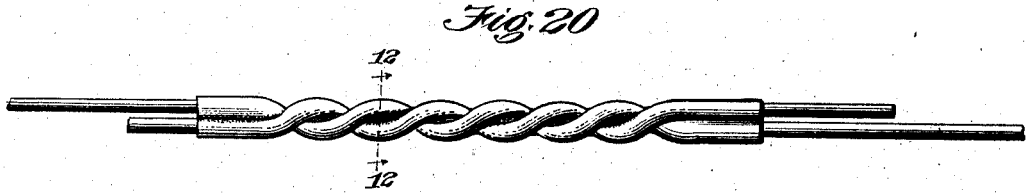
Witnesses
Inventor
Francis W. Maxstadt
by
Attorney.

UNITED STATES PATENT OFFICE.

FRANCIS W. MAXSTADT, OF LOS ANGELES, CALIFORNIA, ASSIGNOR, BY MESNE ASSIGNMENTS, TO FRANK B. COOK, OF CHICAGO, ILLINOIS.

SLEEVE FOR JOINING WIRE ENDS.

No. 878,816.   Specification of Letters Patent.   Patented Feb. 11, 1908.

Application filed November 7, 1904. Serial No. 231,768.

*To all whom it may concern:*

Be it known that I, FRANCIS W. MAX-STADT, a citizen of the United States, residing at the city of Los Angeles, county of Los Angeles, State of California, have invented a new and useful Improvement in Sleeves for Joining Wire Ends, and particularly adapted for joining the ends of wires to be used for conducting electrical currents, and a new and useful improvement in methods of making the same from a single sheet-metal blank, of which the following is a specification.

My invention relates to an improved article of manufacture for use in joining the ends of wires, particularly of wires to be used for conducting electrical currents, and to an improved method of making the same from a single sheet metal blank.

A wire joint should be strong and durable, and, when the wires joined are used as conductors of electrical currents, should afford perfect conductivity. These qualities are best attained if the process of joining the wire ends results in a complete weld thereof so that the joint consists of a solid mass of metal throughout, of unbroken continuity with the wires themselves. This avoids any air spaces being left within the joint into which air, moisture, or other foreign substance can penetrate causing corrosion in the joint, weakening it, and impairing its conductivity when the wires joined are used as electrical conductors.

Previous devices of the class to which my invention belongs have usually consisted of a sleeve comprising two parallel completely cylindrical-shaped tubes, each tube respectively completely incasing one of the wire ends to be joined, which are passed through the respective tubes of the sleeve from opposite directions, the wires being thus separated from each other by the double thickness of the tube  The sleeve with the wires thus incased is then twisted to make the joint. The result of this form is that when the sleeve is so twisted large air spaces are left within the joint, and no weld of the wires and sleeve is caused, but a mere mechanical contact, more or less loose, of the twisted wires results. Hitherto there has been no means devised for welding the wire ends except by heat, which is impracticable because of the expense involved, and which, in the case of hard drawn copper wires such as are used for the conduction of electrical currents, would impair their tensile strength at the joint by drawing the temper of the wire.

The object of my invention is to provide, first: a device for joining wire ends whereby a complete cold weld of the wire ends is accomplished, making a solid mass of metal throughout where the wires are joined, thus obtaining strength and conductivity and avoiding all possibility of corrosion; second: a rapid and economical method of manufacturing the same from a single sheet metal blank through a minimum number of operations, requiring fewer tools and less handling than by any previous method.

As to the first, my invention consists in a sleeve made of any comparatively soft, pliable metal, as for one instance copper, formed with two parallel partially cylindrical-shaped chambers, or interior concave recesses, shown as 21 in Figures 5 and 13 and 16, partially separated from each other, but opening into each other along their longitudinal length, as shown in Figs. 5 and 13, the chambers 21 opening into each other in the medial plane 22. The ends of the wires to be joined are passed through these chambers respectively from opposite directions. When the wires are so inserted in the sleeve, their proximate surfaces do not touch, but are separated by an intervening space. The joint is effected after the ends of the wires are so inserted into the respective chambers of the sleeve by turning or twisting the sleeve, with the contained wires, from three to three and a half times, which draws the points of the sleeve, 23 and 24, together in close contact, closing the opening between the two chambers, which makes each into a complete cylinder, and stretching the metal sleeve completely around each separate wire to tightly bind the same; all air is thus exhausted from inside the sleeve and great pressure exerted upon the incased wires, which results in their welding with the sleeve into a solid mass. This twisting may be done with any ordinary tools such as pliers, clamps, etc.

I show herein two forms in which my sleeve may be manufactured; both by the same method. I form the sleeve from a single sheet metal blank in two operations with two sets of formers and one mandrel, as illustrated in the accompanying drawings, of which the following is an explanation.

Fig. 1 represents the sleeve in use, the completed joint; Fig. 2 represents the sheet metal blank from which I make my sleeve; Fig. 3 is a perspective view of the blank after it has been subjected to the first bending operation of the formers shown in Figs. 7 and 8; Fig. 4 is a perspective view of the mandrel used in the second bending operation; Fig. 5 is a perspective view of the blank after it has been subjected to the second bending operation of the formers shown in Figs. 9 and 10; Fig. 6 is a perspective view of the complete sleeve after it has been soldered or brazed and with wires inserted therein ready to be twisted; Fig. 7 represents a cross section of the male and female formers used in the first bending operation; Fig. 8 represents a cross section of the same after their operation, with the blank between the two bent up and around the tongue of the male former; Fig. 9 represents a cross section of the male and female formers used in the second bending operation; Fig. 10 represents a cross section of the same and of the inserted mandrel—the view shows the formers after their operation, with the blank bent around the mandrel inserted therein, the male former pressing down upon the upper exterior surface of the bent blank; Fig. 11 represents a cross section of Fig. 6; Fig. 12 represents a cross section of Figs. 1 and 20 showing the weld produced by either form of the sleeve herein described; Fig. 13 is a perspective view of another or modified form of my sleeve; Fig. 14 represents a cross section of the same with wires inserted; Fig. 15 is a perspective view of the blank at the end of the first bending operation in making this modified form; Fig. 16 is a perspective view of the same at the end of the second bending operation of this modified form; Fig. 17 is a perspective view of the mandrel used in the second bending operation of this modified form; Fig. 18 represents a cross section of the male and female formers used in the first bending operation in making this modified form; Fig. 19 represents a cross section of the male and female formers used in the second bending operation of this modified form; Fig. 20 represents the completed joint made with this modified form of my sleeve.

A is the male former used in the first operation of my method. It is formed with the inverted T-shaped tongue, 25, having the flat base, 26, and the longitudinal convex, or partially cylindrical-shaped lateral projections, 27. The tongue, 25, is flanked by the triangular parts, 28, having the straight incline faces, 29, terminating in the concavities 30. These triangular parts are separate from the tongue.

B is the female former used in this first operation, formed with the recess, 31, having the flat base, 32, and the concave sides, 33, and with the triangular recesses, 34, into which the triangular parts, 28, of the male former fit, as shown in Fig. 8. The sheet metal blank rests on the longitudinal edges, 35, between the perpendicular surfaces of the recesses, 34, as shown in Fig. 7, these latter surfaces being of just such a distance apart as to allow the blank to fit closely between them and are raised slightly above the longitudinal edges, 35, in order to hold the blank firmly in place. When the male former descends the blank is struck first by the tongue which presses it down into the recess, 31, of the female former, bending its longitudinal edges upward; instantly the triangular parts, 28, descend and their incline faces, 29, roll the longitudinal edges of the blank over the lateral projections, 27, the concavities, 30, fitting down closely upon the rolled edges of the blank, causing it to snugly hug the tongue, 25, as shown in Fig. 8.

C is the male former used in the second operation of my method. It is formed with the tongue, 36, having the sharp central longitudinal ridge, 37, and the concave faces, 38. D is the female former used in this second operation. It is formed with the flat base, 39, and the horizontal jaws, 40, having the perpendicular faces, 41, and the concavities, 42. The blank is removed from the first set of formers after their operation and the mandrel E is inserted into it. The blank with inclosed mandrel is then placed between the jaws, 40, and as the male former descends these jaws of the female former approach each other lining up the blank directly and evenly beneath the ridge, 37, of the male former, and rolling the edges of the blank in opposite directions toward each other, the tongue, 36, of the male former coming between to preserve the shape and press the edges of the blank down closely upon the mandrel, as shown in Fig. 10. This mandrel E is so constructed with a deep central depression, having the flat base, 43, flanked by the longitudinal partially cylindrical-shaped, or convex sides, 44, that when the blank is rolled over it, if one side of the blank should be softer or roll more easily than the other, that side will strike the flat base, 43, of the depression, stopping there, the other side of the blank being then rolled up even with the first side. The diameter of the convex sides, 44, is slightly greater than that of the wires to be joined, so that they may be readily inserted into the sleeve in making the joint. The blank thus rolled, Fig. 5, is then removed and soldered or brazed along the upper medial line between its rolled edges, as shown in Figs. 6 and 11. The result of the operations with the formers and the mandrel just described is an approximately B-shaped sleeve as shown in Figs. 5 and 11. I prefer this form of my sleeve as most satisfactory to accomplish the object of my invention, namely a weld of the wire ends.

The formers represented in Figs. 18 and 19 respectively differ in shape from those just described in the following particulars only: B, the female former of the first operation, Fig. 18, has the central longitudinal ridge, 45; A, the first male former having the corresponding groove or crease, 46, the blank being thus bent with the interior central longitudinal ridge, 47, as shown in Fig. 15; D, the female former of the second operation, Fig. 19, has the central longitudinal ridge, 48, as shown in Fig. 19. In all other respects the formers shown in Figs. 18 and 19 are in shape and do operate precisely like those described, shown in Figs. 7, 8, 9, and 10, like numerals in all my figures representing like parts. The mandrel, F, Fig. 17, used with these latter formers differs from the mandrel, E, already described, in having a central depression on both the upper and the lower side, similar in shape to that in mandrel, E, but not cut so deep. The bent blank is removed after the operation of the formers shown in Fig. 19, and soldered or brazed, as above described, this brazing being shown in Figs. 13 and 14. The result of the operations with these latter formers and this mandrel is an approximately 8-shaped sleeve, as shown in Figs. 13 and 14. All of these formers exceed in length the blank from which the sleeve is formed.

What I do claim as my invention and desire to secure by Letters Patent is:

1. A wire connector of the character described, comprising a rectangular piece of sheet metal having its longer edges rolled toward each other into contact with each other so as to form two hollow cylinders opening into each other and separated from one another by the thickness of the two edges of the sheet metal which extend approximately to the plane of the longitudinal axes of the cylinders to hold the wires to be connected apart, the said edges being brazed or soldered together to securely hold them in this position, and the longitudinal center of the piece of sheet metal being approximately flat to compel the material of the connector to stretch tightly clear around each wire and form in between the wires to meet the said edge portions, when the joint is twisted as described, and thereby completely fill all of the space around each wire so as to form a cold-weld between the connector and the wires, clear around the latter.

2. A wire connector adapted to hold a pair of wires, consisting of a piece of sheet metal having its side edges bent toward each other and turned inwardly toward the longitudinal axis of the connector, said edges being brazed together and forming a longitudinal rib for holding separate the contained wires.

3. A wire connector of the character described comprising a tube adapted to receive a pair of wires side by side therein, said tube having a solid continuous metallic wall, and means connected to said wall and adapted to hold the wires apart within the tube, whereby, upon twisting, the connector forms two completely closed tubes fitting the respective wires.

4. A wire connector of the character described comprising a tube adapted to receive a pair of wires side by side therein, said tube having a solid continuous wall and a rigid inwardly extending longitudinal rib adapted to hold the wires apart within the tube, whereby, upon twisting, the connector forms two completely closed tubes around the respective wires.

5. A wire joint of the character described comprising a tube having a solid continuous wall and a rigid inwardly extending longitudinal rib, and a pair of wires placed side by side in the tube on opposite sides of the said rib which holds the wires apart, the whole being twisted whereby the said tube forms two completely closed tubes fitting the respective wires.

6. A wire connector of the character described comprising a piece of sheet metal having its longitudinal edges bent toward each other and inwardly and brazed to form a tube for receiving a pair of wires, the said edges holding the wires apart in the tube, the longitudinal middle of the piece of sheet metal being left substantially flat, whereby, upon twisting, the tube stretches tightly clear around each wire of the pair separately.

7. A wire connector of the character described comprising a tube adapted to receive a pair of wires side by side therein, said tube having a solid continuous wall, a rigid inwardly extending longitudinal rib adapted to hold the wires apart within the tube, the wall of the tube opposite the said rib being substantially flat, whereby, upon twisting, the tube stretches tightly clear around each wire of the pair separately.

FRANCIS W. MAXSTADT.

In presence of—
    AGNES M. STAMPS,
    E. S. WILLIAMS.